United States Patent [19]

Levett

[11] 4,160,340

[45] Jul. 10, 1979

[54] PLANT PROTECTION DEVICE

[76] Inventor: Albert M. Levett, 1685 Michigan Ave., Miami Beach, Fla. 33139

[21] Appl. No.: 852,430

[22] Filed: Nov. 17, 1977

[51] Int. Cl.² .......................... A01G 9/16; A01G 9/24
[52] U.S. Cl. ........................................... 47/27; 47/17; 47/28 R; 52/82
[58] Field of Search ............... 47/17, 19, 26, 27, 28 R, 47/29; 52/82

[56] References Cited

U.S. PATENT DOCUMENTS

| 419,370 | 1/1890 | Smart | 47/19 |
|---|---|---|---|
| 640,957 | 1/1900 | Sattler | 47/19 X |
| 707,247 | 8/1902 | Merriman | 47/28 |
| 2,135,437 | 11/1938 | Bangert | 52/82 |
| 2,816,329 | 12/1957 | Sogaro | 47/17 X |
| 3,028,872 | 4/1962 | Cresswell | 47/17 X |
| 3,807,088 | 4/1974 | Jones | 47/17 X |

FOREIGN PATENT DOCUMENTS

| 2520304 | 11/1976 | Fed. Rep. of Germany | 47/17 |
|---|---|---|---|
| 1209542 | 3/1960 | France | 47/17 |
| 84429 | 12/1964 | France | 47/17 |
| 1397456 | 3/1965 | France | 47/29 |
| 575694 | 2/1946 | United Kingdom | 47/29 |
| 588800 | 6/1947 | United Kingdom | 47/19 |
| 596198 | 12/1947 | United Kingdom | 47/27 |
| 1231573 | 5/1971 | United Kingdom | 47/29 |

Primary Examiner—Edgar S. Burr
Assistant Examiner—Steven A. Bratlie
Attorney, Agent, or Firm—Sughrue, Rothwell, Mion, Zinn and Macpeak

[57] ABSTRACT

A heavy, immobile ground based enclosure surrounds growing plants. A cover assembly is removably engaged on the enclosure during periods of inclement or unfavorable weather, and is maintained in place by releasable engagement means. The cover assembly has ventilation means, heat transfer means, and liquid spray means associated therewith.

2 Claims, 6 Drawing Figures

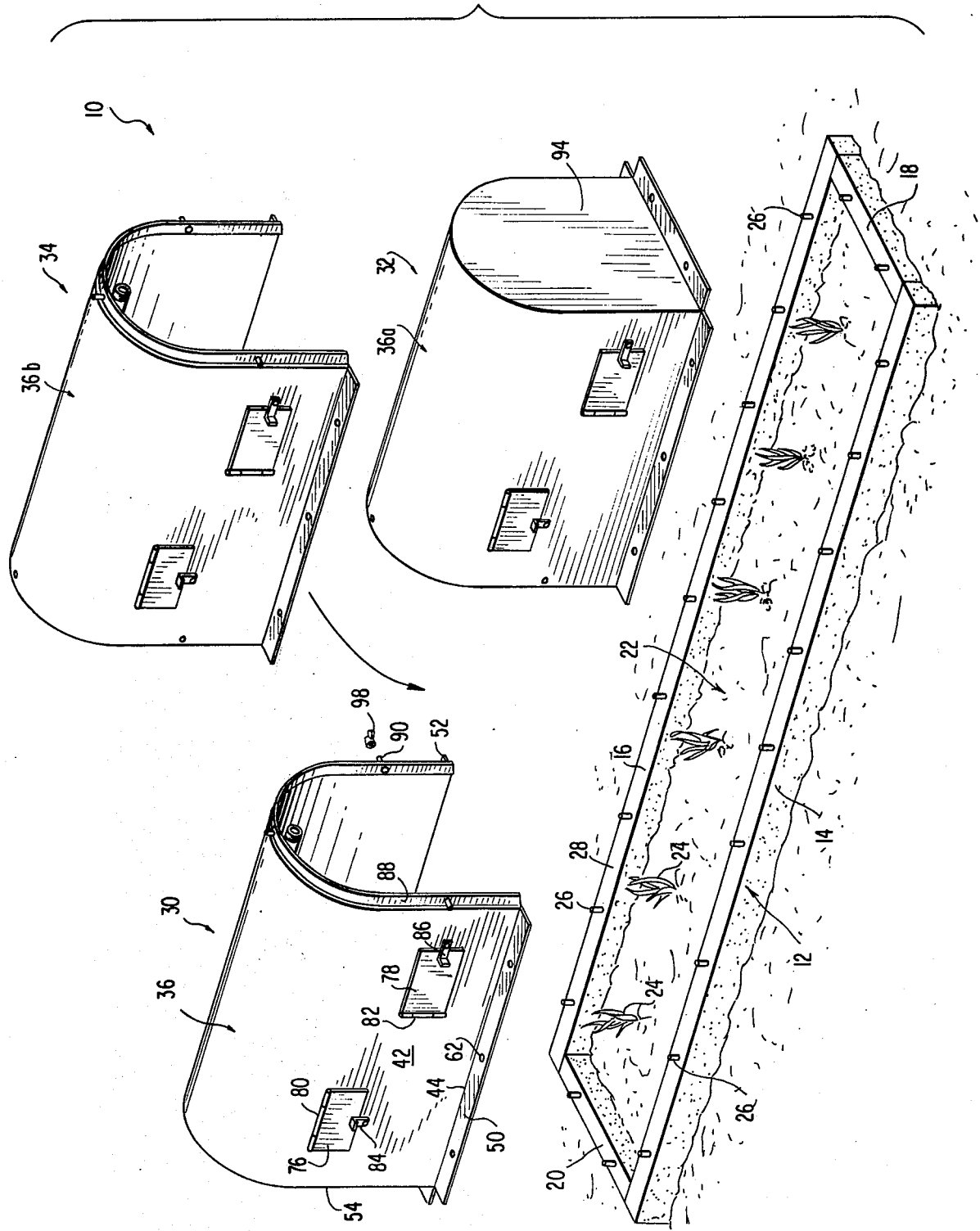

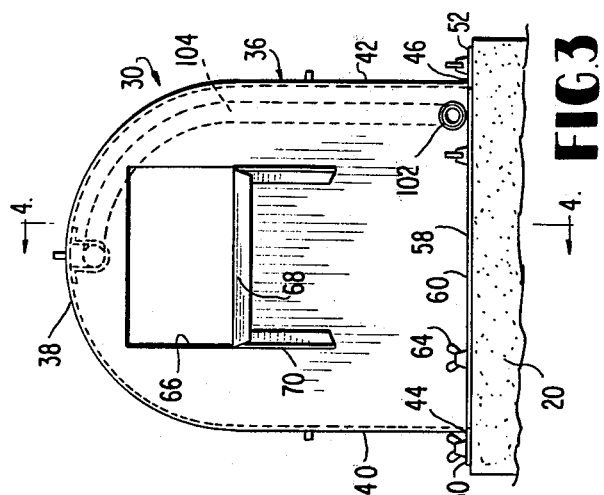
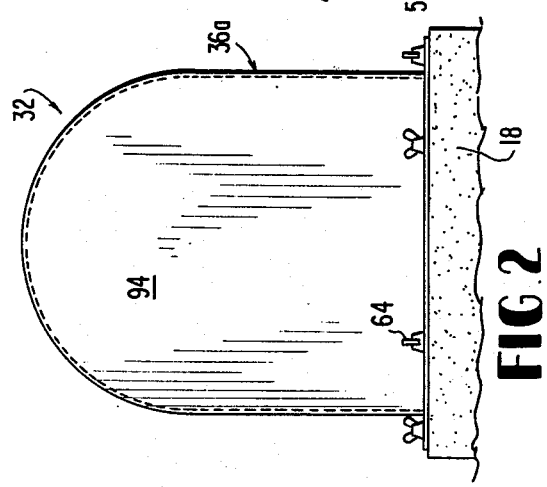
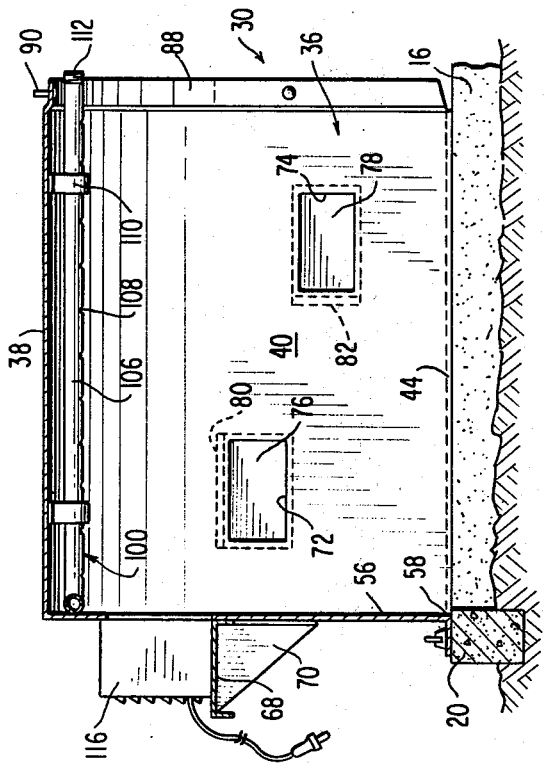
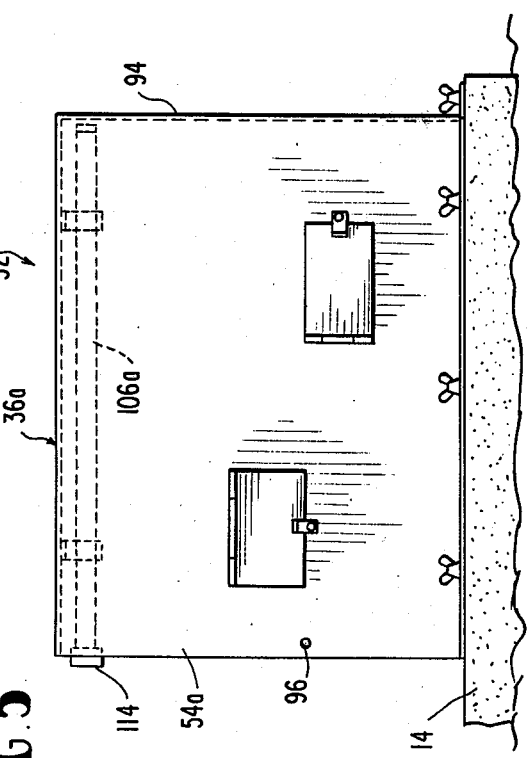
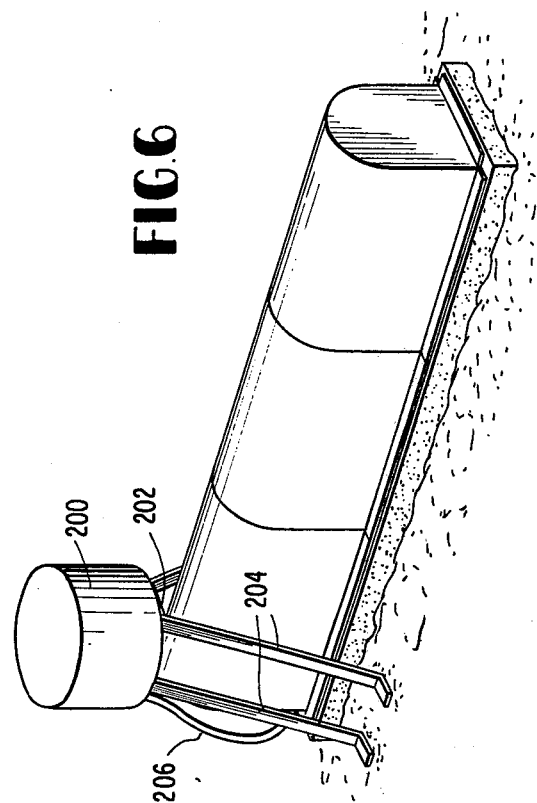

PLANT PROTECTION DEVICE

BACKGROUND OF THE INVENTION

1. Field of the Invention

This invention pertains to the protection of growing plants, and to treatment of those plants. The apparatus is applicable to food crops and to decorative plants.

2. Statement of the Prior Art

The use of enclosures which surround plants, and other temporary enclosures has been heretofore proposed. Representative prior art includes the following U.S. patents:

| Patent No. | Patentee | Date of Issuance |
| --- | --- | --- |
| 558,346 | Boyd, G. W. | April 14, 1896 |
| 707,247 | Merriman, L. J. | August 19, 1902 |
| 3,103,764 | Heuer, H. H. A. | September 17, 1963 |
| 3,203,143 | Swenson, O. J. | August 31, 1965 |

SUMMARY OF THE INVENTION

The present invention is directed to the protection and treatment of crops and the like. An immobile, ground based enclosure is permanently installed at the growing site, and a portable cover is releasably attached to the enclosure as required by weather conditions. The cover assembly incorporates optional heat transfer means to increase or decrease the temperature within the cover.

A further feature of the invention is the incorporation in the cover assembly of liquid spray means. This is employed either in crop irrigation by the introduction of water, or pesticide solutions or the like may be added to the water for plant treatment.

The cover also includes ventilation means to adjust the inside atmosphere for short time variations in temperature.

Other and further objects and advantages of the invention will become apparent to those skilled in the art from a consideration of the following specification when read in conjunction with the annexed drawings.

BRIEF DESCRIPTION OF THE DRAWING

FIG. 1 is a perspective view, disassembled, showing the invention hereof as applied in practice in a typical environment of use;

FIG. 2 is an enlarged end elevational view from the closed terminal end section of the apparatus;

FIG. 3 is a view similar to FIG. 2, but illustrating the opposite, introduction end section;

FIG. 4 is a sectional view on Line 4—4 of FIG. 3, showing details of the introduction end section;

FIG. 5 is a side elevational view of the terminal end section; and

FIG. 6 is a perspective view showing a modification.

DESCRIPTION OF THE PREFERRED EMBODIMENT

Referring to the drawings in more detail, a plant protection and treatment system hereof is therein shown and generally identified by reference character 10. The system 10 provides a permanently installed enclosure 12 of heavy construction, for example, the enclosure is made of concrete or other heavy aggregate materials. The enclosure includes elongated substantially rectangular stringers 14, 16 arranged in laterally spaced relationship, and end blocks 18 and 20, which span the ends of the stringers. These stringers and blocks define a rectangular growing site 22 in which a plurality of plants 24 are grown.

Embedded in the stringers and end blocks during fabrication are threaded bolts 26. The bolts 26 project vertically from the top surfaces 28 of the stringers and blocks to serve as components of a releasable engagement means for the cover assembly.

The cover assembly includes at least an introduction end section 30 and a terminal end section 32. Depending upon the particular installation, one or more intermediate sections 34 may also be employed. All of the sections are formed principally of lightweight sheet metal, such as aluminum, or the like, to facilitate placement and removal.

The introducton section 30 comprises a body portion 36 having an arch form top portion 38 and sides 40 and 42. The sides 40 and 42 terminate at lower side edges 44, 46, respectively, and horizontal flanges 50 and 52 project outwardly therefrom. One end 54 of the introduction section is closed by a first end wall 56. The wall 56 has a bottom end edge 58 with an outwardly bent horizontal flange 60. All of the flanges 60, 50 and 52 have holes 62 formed therein, the holes being so located that the flanges are adapted to rest on the end block 20 and stringers 14 and 16 with the bolts 26 thereof extending through the holes 62. Wing nuts 64 are employed to clamp the cover section in place.

The introduction section first end wall 56 has a substantially rectangular port 66 formed therein at a midpoint location. Immediately below the port is an exterior horizontal shelf 68 supported by gusset plates 70. The port and shelf serve functions appearing in more detail below.

Optionally usable ventilation means for the sections comprise first and second side ports 72 and 74. Each of these has an exterior door 76, 78, mounted by upper and side piano hinges 80, 82, respectively. The doors have pivotal latch closures 84, 86. Thus, in the event of overheating, insufficient light, or other necessity for ventilation, the ports may be selectively opened or closed.

The end of the body portion 36 opposite the first end wall 56 is open. The end edge of the body portion is, however, provided with a depressed lip section 88. Extending from the lip section at spaced intervals are a series of bolts 90. These serve in the engagement of the next adjacent section to the introduction section.

The cover assembly further includes a terminal end section 32 somewhat similar to the introduction section, like components being identified by the same reference numerals with the letter "a" appended thereto. The terminal section has a body portion 36a with a top 38a and sides 40a, 42a. The side edges 44a, 46a of the sides include horizontal flanges 50a and 52a which project outwardly therefrom. The end 92 of the section 32 is, however, closed by an imperforate end wall 94. The terminal section may be directly connected to the introductory section if desired. This is accomplished through engagement of the bolts 90 through 96 formed in the end 54a of the body portion 36a. Wing nut 98 completes this assembly.

If a longer cover assembly is needed, a selected number of intermediate sections is incorporated in the assembly. These again are similar in structure to the first described sections, like reference characters being applied with a letter "b" appended for distinction. The body portion 36b thus has a top portion 38b with sides 40b and 42b and flanges 50b and 52b engagable on the enclosure.

The apparatus includes a liquid spray system 100 for introducing either water for irrigation purposes, or liquid plant treatment chemicals such as pesticides. In a first embodiment, the system comprises an inlet hose fitting 102 on the end wall 56 of the introductory section. The fitting is connected to an imperforate inside hose 104 which in turn leads to an elongated tube 106 having a plurality of spray orifices 108 therein. The tube 106 is suspended on the inside of the top portion 38 by hangers 110 and has a threaded terminal 112 projecting from the top section 38. As best seen in FIG. 5, the terminal cover section has a tube 106a with a female threaded connector 114 engagable with the terminal 112. The intermediate sections 34 similarly have tubes with female and male connections compatible with those of the introduction and terminal sections. These fittings and the tubes are sufficiently flexible to permit connection and disconnection as the respective sections are assembled or disassembled.

Heating or cooling of the air within the cover and enclosure is accomplished by placement of a heating or cooling unit with a fan on the shelf 68. Typically, a small electric heating unit 116 may be used, although other and different heating and cooling units are contemplated.

In FIG. 6, a modification is shown wherein the cover and enclosure have a liquid supply tank 200 mounted on a stand 202 over the introduction section. Legs 204 support the stand, and a hose 206 connects to the tubes to permit gravity feed of liquids. Water or other liquids are pumped into the tank from tank trucks or other available sources.

From the foregoing, it will be seen that upon the forecast of inclement or other unfavorable weather conditions, the plants normally growing within the enclosure may be covered temporarily, and during the period of covering, may be treated with water or other chemical treatments. Also, the temperature within the cover may be regulated so that, for example, in the event of unanticipated cold weather, crops are not adversely affected. When weather conditions improve, it is proposed that the cover elements simply be removed and stored at a suitable location.

I claim:

1. Means for the protection and treatment of growing crops comprising:
    a ground based heavy enclosure including side stringers and end blocks;
    a series of connector elements fixedly secured at spaced intervals along the stringers and end blocks, said connector elements comprising upstanding bolts partially embedded in the stringers and end blocks;
    the ground based enclosure surrounding a plurality of growing plants;
    a vertically removable sectional cover assembly for said enclosure including a plurality of end-to-end joined vertically removable light weight sheet metal sections including an elongated arch form body portion; the arch form body portions having a top portion and sides with opposite lower side edges;
    ventilation means for the cover assembly comprising a series of ports formed in the sides of the body portions and having doors pivotally mounted on the sides adjacent the ports;
    a horizontal flange extending outwardly from each of said lower side edges;
    a first end wall on the body portion of one of said sections having a bottom end edge, and a horizontal end flange projecting outwardly from said edge;
    a closed end wall on another of said sections having a bottom end edge with an outwardly projecting flange;
    the flanges having a plurality of holes formed therein;
    the cover assembly being dimensioned to overlie the enclosure with the flanges of the side edges resting on the side stringers and the end flanges of said sections on the end blocks, with said bolts extending through the holes provided therein;
    wing nuts threaded to the ends of the bolts projecting vertically from the holes within said flanges to releasably clamp said cover assembly in place for ready vertical lift removal from said ground based heavy enclosure;
    a liquid spray system including an inlet hose extending through an end wall of said cover assembly and being connected to a liquid source outside the cover assembly, and an outlet spray tube extending along the top portion of the cover assembly, said spray tube comprising end-to-end joined tube sections corresponding to the cover assembly section and being fixed to the bottom of said cover assembly section at the center thereof, said outlet spray tube having orifices to form the spray at spaced intervals;
    said one end wall having a port formed therein;
    a bracket on said one end wall below and adjacent the port; and
    a heat transfer device removably mounted on the bracket, said heat transfer device having fan means therein to introduce heated or cold air into the cover assembly, the connecting ends between adjacent sections for one of said sections bearing a depressed lip and receiving the edge of the other adjacent section such that said edge overlies said lip; whereby, the outside surfaces of the adjacent sections are flush with each other, and bolts extending perpendicularly from said lip and fixed thereto and extending through holes within the edge of the adjacent section to lock said sections against longitudinal movement but permitting ready vertical lift of said sections from said ground based heavy enclosure upon unthreading of said wing nuts, and threaded connector means for threadably connecting the ends of the respective outlet spray tubes of adjacent sections to permit rapid completion and disconnection of the flow path for the liquid spray system throughout the length of said removable sectional cover assembly and permitting rapid placement and removal of said vertically removable sectional cover assembly and the components carried thereby.

2. The invention of claim 1, wherein: said heat transfer device comprises an electric heater with a fan to direct heated air through said port of the cover assembly section one end wall.

* * * * *